United States Patent Office 3,120,480
Patented Feb. 4, 1964

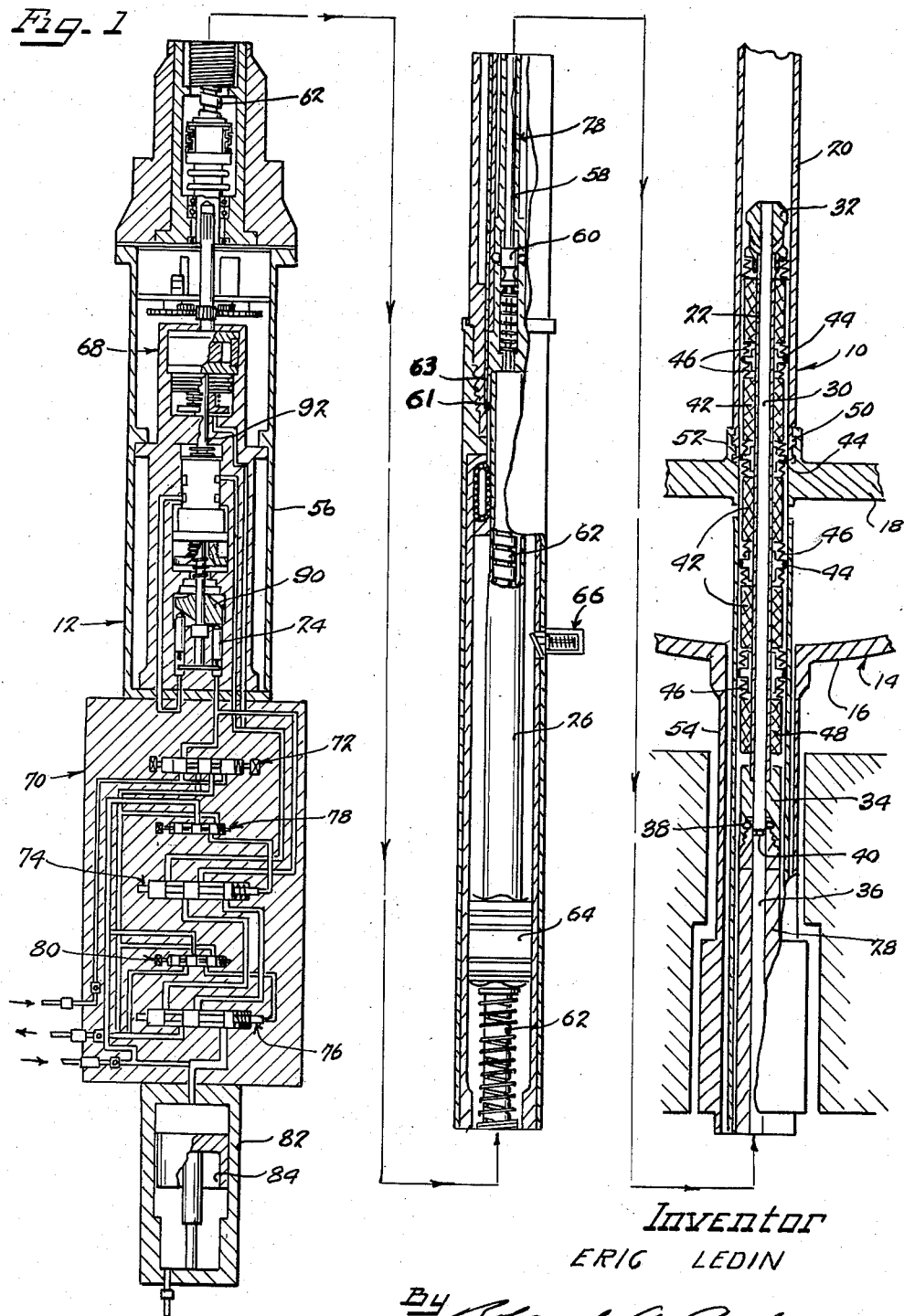

3,120,480
CONTROL ROD FOR NUCLEAR REACTORS
Eric Ledin, La Jolla, Calif., assignor, by mesne assignments, to the United States of America as represented by the United States Atomic Energy Commission
Filed Aug. 2, 1961, Ser. No. 128,913
6 Claims. (Cl. 176—35)

The present invention relates generally to a nuclear reactor and is more particularly directed to an improved construction and arrangement for a control rod assembly for nuclear reactors.

In a nuclear reactor there is provided a plurality of control rods which include neutron absorbing or "poison" material and which are disposed for movement relative to a position fully within the reactor core, in order to thereby regulate the rate of nuclear reaction within the core. Means are provided for moving the control rods relative to the reactor core, and at least some of the control rods include means for substantially instantaneously driving the control rod into the reactor core, in order to "scram" the reactor when an emergency situation exists.

It is a primary object of the present invention to provide a novel and improved form of control rod for a nuclear reactor. A further object of the invention is to provide a control rod assembly wherein the neutron absorbing material is arranged in a novel manner which affords greater protection against thermal and mechanical forces on the control rod. Other objects and advantages will become apparent from the following description of the selected embodiment illustrated in the accompanying drawing, wherein:

FIGURE 1 is a cross-sectional view of the control rod and drive assembly, with the latter shown schematically.

The illustrated embodiment includes a control rod assembly 10, and a drive assembly 12 which is associated and connected with the lower end portion of the control rod assembly. The illustrated structure is particularly adapted for use with nuclear reactors of the gas-cooled type, wherein the reactor vessel is disposed vertically and the control rods are positioned for movement into and out of the reactor core from a position below the core. However, it will become apparent as the description progresses that various features of the structure described herein may also be used to advantage in connection with other types of nuclear reactors.

In the illustrated embodiment the nuclear reactor 14 includes a pressure vessel having a bottom wall 16, and a bottom grid plate 18 is disposed in the lower portion of the vessel to provide a support for the reactor core assembly which includes the fuel elements (not shown) and a plurality of control rods for regulating reactivity within the core. The bottom grid plate 18 also provides a support for the control rod guide tubes 20. Since the configuration of the pressure vessel and the detailed construction of the reactor core are not essential elements of the present invention, it is believed that detailed descriptions and drawings of these structures are unnecessary to a proper understanding of the present invention.

With reference particularly to FIGURE 1, it will be seen that the control rod assembly 10 includes a guide tube 20, which is detachably secured to the grid plate 18 in vertically extending relation thereto, and the control rod 22 including the neutron absorbing material. The control rod drive assembly 12 includes a fluid pressure operated motor 24 which is connected with the control rod through means of an axially movable push rod including a lower hollow section 26 and an upper section 28 which is essentially solid. The drive mechanism is entirely fluid operated and is effective to move the control rod 22 into and out of the guide tube 20 within the reactor core, to thereby regulate the reactivity within the core, and such drive mechanism is also operable under emergency conditions to almost instantaneously drive the control rod to its fully inserted position within the reactor core.

The control rod proper comprises a central support rod 30 which is tubular and preferably formed of a high temperature alloy, and the upper end of this support rod is provided with a lifting knob 32. The latter is brazed or otherwise fixed to the support rod and extends beyond the guide tube when the control rod is fully inserted into the core, so as to afford removal of the control rod by means of a fuel transfer mechanism (not shown) located in the upper part of the pressure vessel. The lower end of the support rod 30 has a coupling element 34 fixed thereto, which is adapted to be releasably connected with a complementary coupling element 36 on the upper push rod section 28. More particularly, the coupling includes an annular recess or groove adapted to be engaged by the balls 38 controlled by a lock operator 40 at the upper end of the push rod.

The "poison" or neutron absorbing material in the control rod is divided into relatively short cylindrical segments 42 which are disposed in coaxial relation to the support rod. The poison sections 42 have a diameter somewhat less than the inner diameter of the control rod guide tube 20 to provide clearance therebetween. Each poison section is yieldably held in position along the support rod 30 by spacers 44 and a plurality of flexible metal disc washers 46 which are disposed between each spacer and the poison section. The spacers 44 are brazed or otherwise fixed to the support rod 30, and the outer surface of each spacer is provided with a rider ring preferably formed of ceramic and split to facilitate assembly. This rider ring slidably engages the inner surface of the guide tube 20 and provides the bearing surface between the control rod and the guide tube. The flexible disc washers 46 are preferably preloaded at relatively low temperatures to ensure a predetermined minimum compression load on the sections at reactor operating temperatures. The spacers 44 are preferably a wrought, high temperature alloy such as Haynes alloy No. 25. The cushioning provided for the poison sections by the flexible discs 46 allows only axial compression loading due to differential thermal expansion and/or acceleration loads from the drive mechanism.

The end sections on the control rod 22 each include a reflector 48 of graphite or the like, which is geometrically similar to the poison sections 42. With the described arrangement, an unaccountable thermal or mechanical shock of sufficient magniture to fracture the poison material is generally localized to a relatively short length of the over-all control rod. Moreover, in the event of maximum heat generation within the core, which might result in the fusion of the metal spacers 44, the total drop of the poison sections in the guide tube would be a very small percentage of the over-all length.

The guide tube 20 is detachably fixed in position on the grid plate 18 by an interrupted screw coupling, bayonet connection, or the like, between a collar 50 on the lower end of the guide tube and a complementary coupling element 52 fixed on the grid plate. The control rod assembly and the graphite guide tube are generally self-supporting, but due to the described structural arrangement of these parts there is sufficient flexibility in such structure to permit the control rod assembly to negotiate a bowed and inclined guide tube in the event that stresses within the reactor core produce such effect.

Extending downwardly from the bottom part of the reactor vessel is a generally cylindrical, elongated housing 54 for the push rods and the drive screw, and the lower end of this housing has detachably secured thereto a control rod drive housing 56. The upper push rod section 28 is generally solid but has a relatively small axial bore therethrough to accommodate an actuator rod 58 which is provided with the lock operator 40 at its upper end and a similar operator 60 at its lower end. As seen in FIGURE 1, the lock operator 40 includes a cylindrical portion having an annular groove formed therein and adapted to receive the balls 38 and permit the latter to move out of their position providing locking engagement between the outer coupling element 34 on the lower end of the control rod 22 and the inner coupling element 36 on push rod 28, and thus free the control rod 22 for upward movement. A similar locking mechanism 60 is provided for the lower end of the upper push rod section, to provide a releasable locking connection between the lower end of the upper push rod 28 and the upper end of the hollow push rod section 26 disposed therebelow.

The rod 58, which joins the lock operators 40 and 60, is spring-biased into its lowered position wherein both latches are held closed. In order to release the latches, the lower drive housing 56 is removed, together with its contents, and a tool is inserted through the bottom part of the housing and upwardly through the hollow center of the lead screw until such tool engages the lower end of the connector 60. An initial movement of the tool upward results in a release between the control rod assembly 22 and the upper push rod 28, to permit withdrawal of the control rod assembly upwardly through the guide tube 20. A second step of upward movement releases the latch 60 between the two push rod sections, thereby permitting the hollow push rod 26 to be moved downwardly. An internal shoulder 61 is preferably formed in the guide sleeve 63 in order to prevent downward movement of the solid push rod 28 when lead screw 62 and hollow push rod 26 is uncoupled and removed for servicing.

The hollow push rod 26 is connected at its lower end to a ball screw drive, including a lead screw 62 and a ball nut 64 which are disposed in a generally known manner so that rotation of the lead screw effects axial movement of the ball nut in the housing 54. The lower end of the lead screw is connected with the hydraulic motor 24 of the axial piston type, and the ball nut 64 is splined or otherwise fixed against rotation within the actuator guide tube or housing 54, so that operation of the motor results in rotation of the lead screw 62 and vertical movement of the ball nut 64 in the guide tube. A releasable holding lock 66 is disposed a short distance below the uppermost position for the ball nut 64, in order to prevent inadvertent downward movement of the control rod and push rod assembly in the event of failure of the drive mechanism. This holding lock 66 is normally spring-biased into a position projecting within the housing 54 and is solenoid operated so that it can be withdrawn from the housing when desired, as during regulating movement of the control rod. The control rod drive mechanism 12 includes a backstop clutch and brake, indicated generally at 68, to prevent drifting of the lead screw downwardly.

The hydraulic motor 24 is suitably connected with a source of fluid pressure through control valve means 70. Such valves includes a directional regulating valve 72, which is adapted to direct the flow of fluid during ordinary regulating movement of the control rod, and there is also provided scram valves 74 and 76, which are operated only during emergency situations to provide an accelerated flow of fluid to the motor and which include pilot valves 78 and 80, respectively. The use of a plurality of scram valves is particularly effective in checking the operation of the drive mechanism without actually producing movement of the control rod. The pressure fluid for scramming operation of the control rod is contained in an accumulator 82 having a piston 84 which is constantly under pressure. The pressure is maintained by the compressed volume of gas below the piston 84. This volume is initially precharged to a set pressure from an external gas pressure source and is constantly maintained at this pressure throughout the operation of the reactor. During scramming operation the scram pilot and scram main valves are immediately positioned to provide for the flow of pressure fluid directly from the accumulator 82 to the hydraulic motor 24, and the latter is thereby operated at a greatly accelerated rate.

The axial piston type hydraulic motor 24, shown in connection with the control rod drive mechanism 12, includes a motor drive shaft 90 connected at its upper end with a driven shaft 92 which, in turn, is connected to the lead screw 62. The driven shaft 92 is associated with a back-stopping clutch and brake assembly 68 which is adapted to prevent drifting of the lead screw downwardly.

Thus it is seen that there is provided an improved form of control rod for a nuclear reactor, which is arranged and constructed to provide essentially trouble-free operation and which is particularly advantageous in accommodating thermal and mechanical shock loads on the control rod in a manner which prevents any serious damage to the rod or impairs its effectiveness.

Although shown and described with respect to particular structure, it will be apparent that other structural forms might be utilized to achieve the advantages of this invention, and without departing from the principles thereof.

What is claimed is:

1. A control rod for use in a nuclear reactor comprising an elongated support rod, spacer elements fixed to said support rod at spaced intervals therealong, a generally cylindrical section of neutron absorbing material coaxially disposed on said support rod intermediate adjoining pairs of said spacer elements, and a flexible metal compressible disc washer intermediate each spacer element and the adjoining end of said section of neutron absorbing material in position on said section to cushion said section against shock loads.

2. A control rod for use in a nuclear reactor comprising an elongated tubular support rod, a plurality of spacer elements fixed to said support rod at uniformly spaced intervals therealong, a generally cylindrical section of neutron absorbing material coaxially disposed on said support rod intermediate adjoining pairs of said spacer elements, and a plurality of flexible metal compressible disc washers intermediate each spacer element and the adjoining end of said section of neutron absorbing material on said section so as to yieldably position said sections axially of said support rod and cushion said sections against shock loads and thermal expansion.

3. A control rod for use in a nuclear reactor comprising an elongated tubular support rod having an axial passage therethrough, a lifting knob fixed to one end of said support rod, means fixed to the other end of said support and affording engagement with a push rod, a generally cylindrical section of reflector material disposed in coaxial relation with said support rod at a position thereon adjacent said push rod engaging means, a plurality of spacer elements fixed to said support rod at spaced positions therealong, a plurality of generally cylindrical sections of neutron absorbing material disposed coaxially of said support rod intermediate each adjoining pair of said spacer elements, and a cushioning and expansion means intermediate each of said spacer elements and said sections comprising an axially flexible metal compressible disc washer.

4. A control rod assembly for use in a nuclear reactor comprising an elongated tubular support rod having an axial passage therethrough, a lifting knob fixed to one end of said support rod, a coupling element fixed to the other end of said support rod in position for locking engagement with a push rod, a generally cylindrical section of reflector material disposed in coaxial relation with said support rod and adjacent said coupling element, a plurality of spacer elements fixed to said support rod at generally uniformly spaced positions therealong intermediate said lifting knob and said coupling element, each of said spacer elements having a cylindrical outer surface of ceramic material providing a heat resistant bearing surface, a plurality of generally cylindrical sections of neutron absorbing material disposed coaxially of said support rod intermediate each adjoining pair of said spacer elements, and a cushioning and thermal expansion means intermediate each of said spacer elements and said sections, each of said last mentioned means comprising a plurality of axially flexible metal compressible disc washers disposed in precompressed, engaging relation between an end of the section and said spacer element.

5. In a nuclear reactor having a vertically extending pressure vessel including a lower grid plate supporting a reactor core assembly, a control rod assembly comprising an elongated guide tube fixed to said grid plate in upwardly extending relation thereto, a control rod movable axially within said guide tube and comprising an elongated tubular support rod having an axial passage therethrough, a lifting knob fixed to the upper end of said support rod, a coupling element fixed to the lower end of said support rod in position for locking engagement with a push rod, a generally cylindrical section of reflector material disposed in coaxial relation with said support rod at a position thereon adjacent said coupling element, a plurality of spacer elements fixed to said support rod at generally uniformly spaced positions therealong, each of said spacer elements having a cylindrical outer surface of ceramic material providing a heat resistant bearing surface for slidably engaging the interior of said guide tube, a plurality of generally cylindrical sections of neutron absorbing materials disposed co-axially of said support rod intermediate each adjoining pair of said spacer elements, said sections having dimensions affording clearance between said guide tube and the sections, and a cushioning and thermal expansion means intermediate each of said spacer elements and said sections comprising a plurality of axially flexible metal compressible disc washers disposed in precompressed relation between an end of the section and said spacer element.

6. A control rod and drive assembly for use in a nuclear reactor, comprising an elongated housing adapted to be fixed to the bottom wall of a vertically disposed reactor pressure vessel in downwardly extending relation thereto, drive mechanism in a lower portion of said housing including a rotatable drive shaft, a reversible hydraulic motor connected with one end of said drive shaft, and a screw drive means connected with the other end of said drive shaft and including a lead screw and a ball nut thereon which is adapted for movement axially of said elongated housing in response to rotary movement of said drive shaft and said lead screw, a push rod disposed in the upper portion of said housing and connected at its lower end with said ball nut for axial movement therewith, said push rod comprising a lower hollow portion adapted to telescopically receive said lead screw and an upper portion in axially extending relation to said lower portion, a control rod connected with the upper end of said upper push rod portion in axially extending relation thereto, means for detachably connecting said lower push rod section with said upper push rod section and for detachably connecting said upper push rod section with said control rod comprising a pair of couplings each including a ball type locking element including a cylindrical part disposed for movement axially of the push rod and having an annular outer recess permitting movement of the coupling locking balls toward the push rod axis to release the coupling, said cylindrical parts being interconnected by an elongated rod and said annular recesses being arranged so that axial upward movement of said elongated rod and cylindrical parts initially releases one of said couplings and continued upward movement releases the other of said couplings, said control rod comprising an elongated center support rod, a plurality of spacer elements fixed to said support rod at spaced positions therealong, a generally cylindrical section of neutron absorbing material intermediate each adjoining pair of said spacer elements, and a plurality of axially flexible compressible disc washers between each of said spacer elements and the ends of the adjoining sections of neutron absorbing material, and a control rod guide tube adapted to be fixedly disposed within said pressure vessel in vertically extending position to receive said control rod with said spacer elements slidably engaging the inner wall of said tube.

References Cited in the file of this patent

UNITED STATES PATENTS

| | | |
|---|---|---|
| 2,830,944 | Wigner et al. | Apr. 15, 1958 |
| 2,868,706 | Untermyer et al. | Jan. 13, 1959 |
| 2,900,316 | Kaufman et al. | Aug. 18, 1959 |
| 2,990,360 | Porembka | June 27, 1961 |
| 3,031,397 | Fortescue et al. | Apr. 24, 1962 |

FOREIGN PATENTS

| | | |
|---|---|---|
| 1,100,831 | Germany | Mar. 2, 1961 |